United States Patent

Reynolds

[15] 3,668,378

[45] June 6, 1972

[54] REGISTERING APPARATUS

[72] Inventor: Eugene E. Reynolds, Orangeburg, S.C.

[73] Assignee: SCM Corporation

[22] Filed: Mar. 24, 1969

[21] Appl. No.: 809,694

[52] U.S. Cl. ....................235/155, 340/347 DD, 235/61.6 K, 235/61.9 R

[51] Int. Cl. ..........................................................G06f 5/02

[58] Field of Search .............................235/61.9, 61.65, 155; 340/347 DD

[56] References Cited

UNITED STATES PATENTS 2,588,190 3/1952 Wockenfuss..........................235/61.6

3,010,653 11/1961 Canepa..............................235/61.6 X

*Primary Examiner*—Maynard R. Wilbur
*Assistant Examiner*—Joseph M. Thesz, Jr.
*Attorney*—Joe O. Bolt, Jr.

[57] ABSTRACT

The invention relates to a mechanism for printing values entered in a keyboard or transmitted from a computer. Normally, values entered in a keyboard are entered in the decimal system of notation and values received from a computer or other external source are transmitted in a binary code. With this thought in mind, this invention provides a mechanism for receiving information from either an internal keyboard in decimal values or from an external source in binary coded values, entering said values serially into a storage and printing out said values in parallel.

11 Claims, 36 Drawing Figures

REGISTERING APPARATUS

Figure 1:
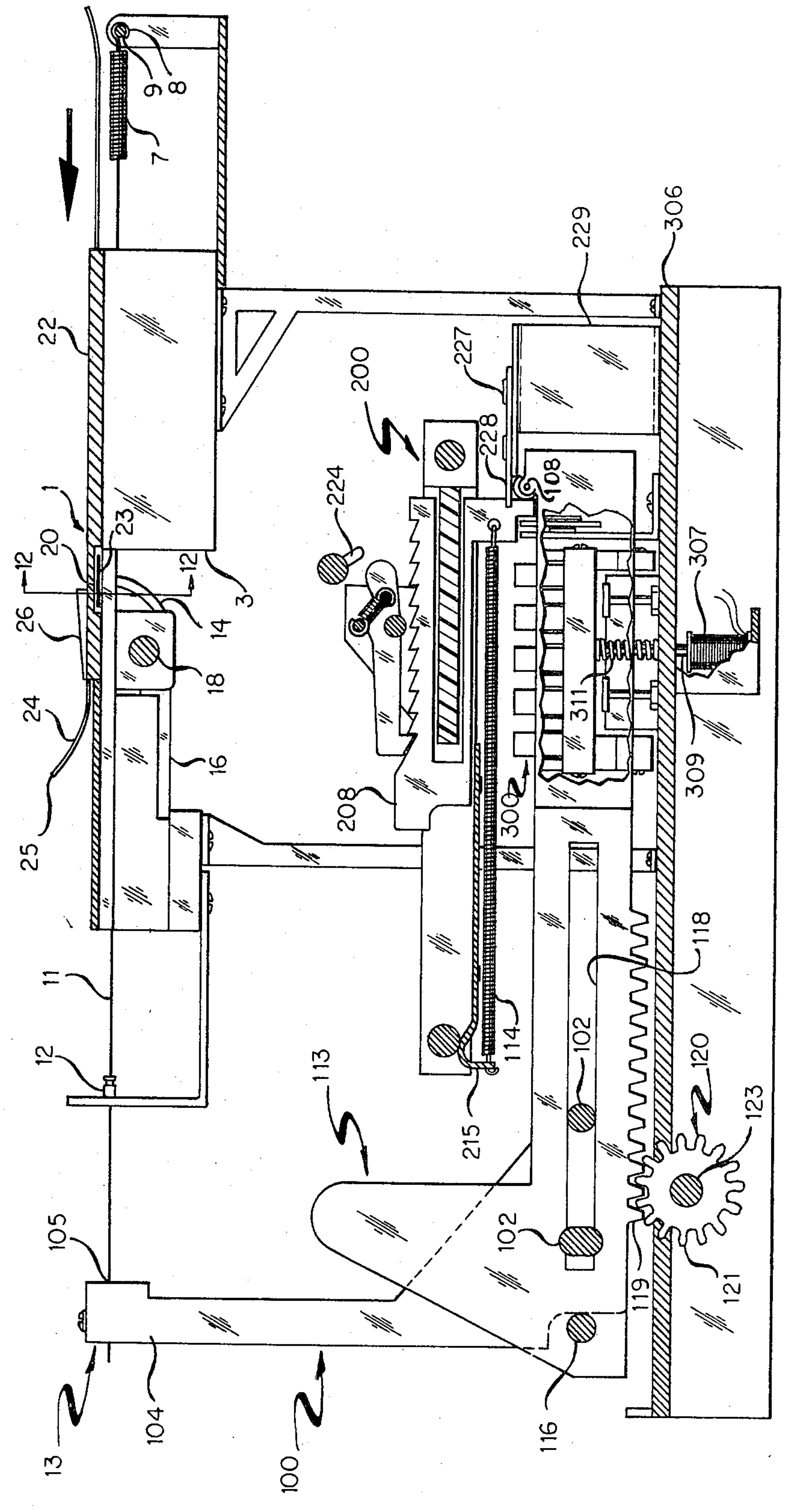

It is a primary object of this invention to provide an improved printout device which will satisfy the needs of printing values selected at a manual keyboard or transmitted from a computer or remote device having value transmitting capabilities.

Another object of this invention is to provide a registering or read-out apparatus having an ordinal series of differentially movable actuating members which have a corresponding series of differentially settable character display or type members adapted to be arrested in positions to set the display or type members in accordance with data to be registered.

A further object of this invention relates to converting a first or binary code in corresponding second or decimal code values of mechanical movement.

Another object of the invention is to provide an apparatus for translating the energization of one or more solenoids into decimal displacement which bears a direct relation to the numeric value represented by the energization pulse and which can be used to effect a corresponding positioning of a print strip.

Still another object of the invention is to provide a storage means whereby the output information produced by the transducer can be entered therein serially, order by order.

Another object of this invention is to provide an input means and storage means movable relative to each other.

Another object of this invention is to provide the combination of a receiving means and decoding means with a storage means having serial input means and parallel read-out means.

Still another object of this invention is to provide a transducer having a plurality of graduated and selectively movable stops adapted to be moved by binary input signals.

A still further object of this invention is to provide a shifting storage means which is capable of directly sensing the position of stop elements positioned by binary signals to establish a decimal value in each order of the storage.

Another object of this invention is to provide a storage means having an ordinal series of settable locator slides.

An important feature in this invention resides in the fact that the apparatus is of simple compact construction, economical of manufacture, and comparatively fast in operation.

Other objects of the invention will be pointed out in the following description and claims and illustrated in the accompanying drawings, which disclose, by way of examples, the principle of the invention and the best mode, which has been contemplated of applying that principle.

Figure 2:
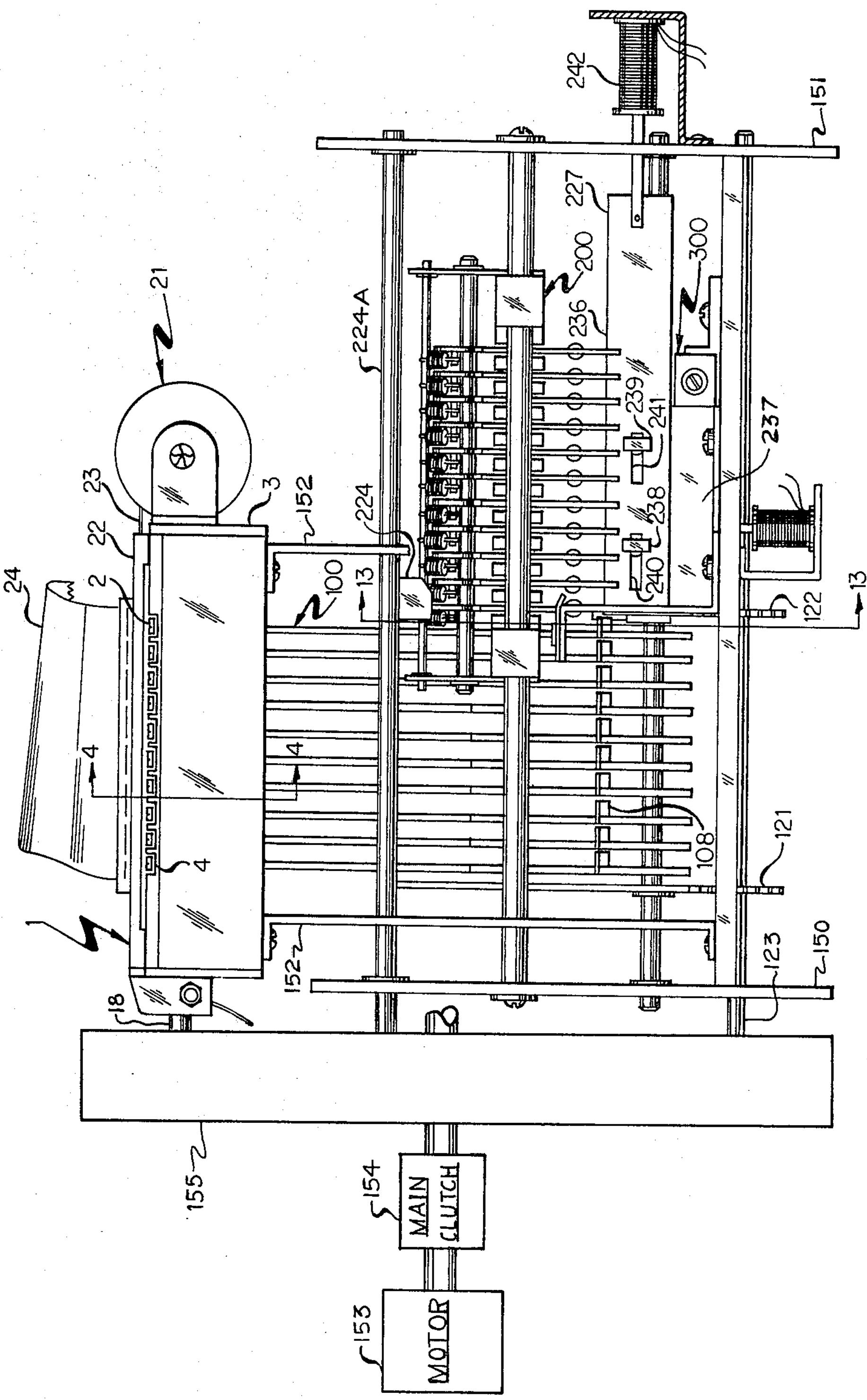
Figure 3:
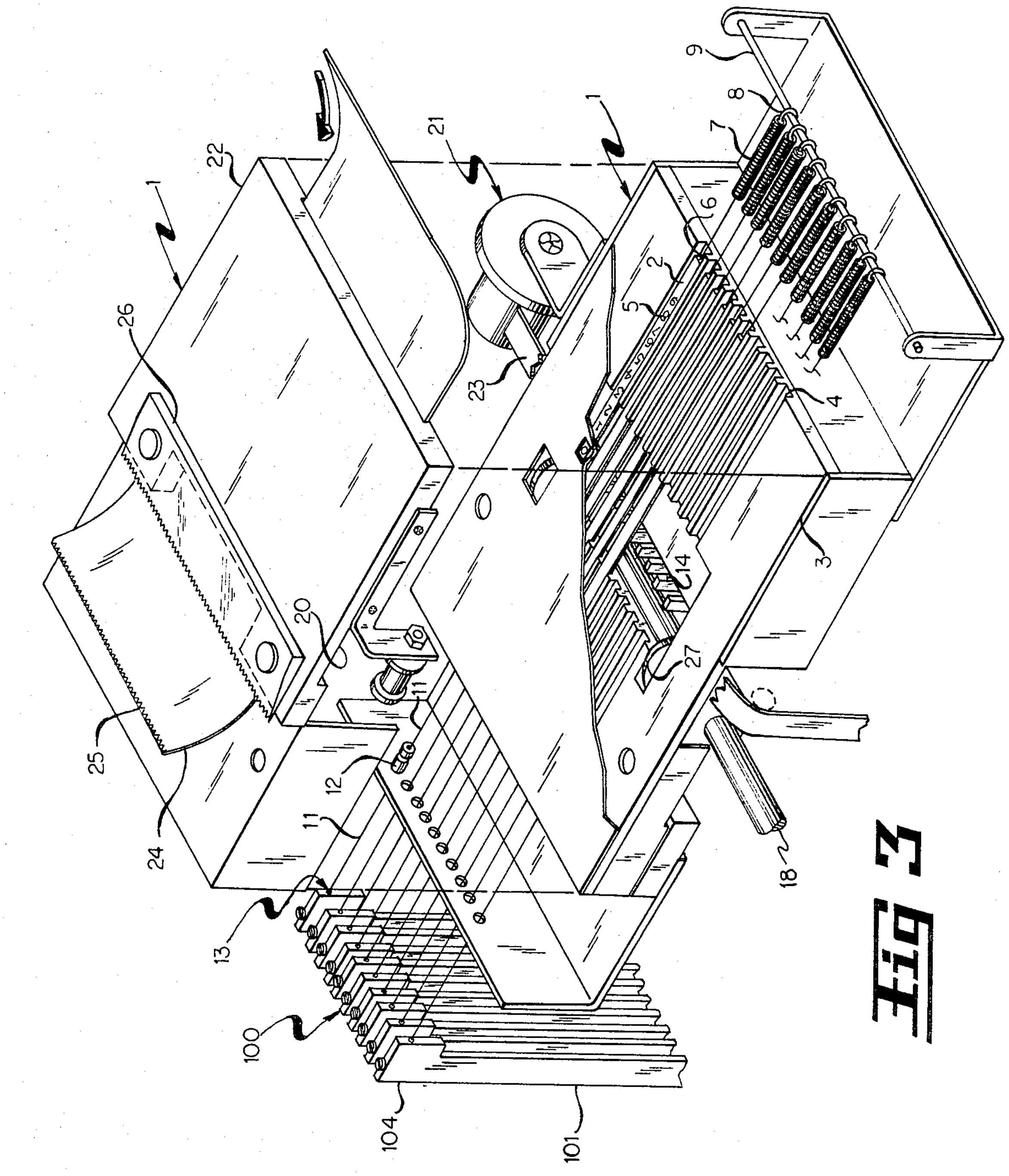
Figures 4, 5:
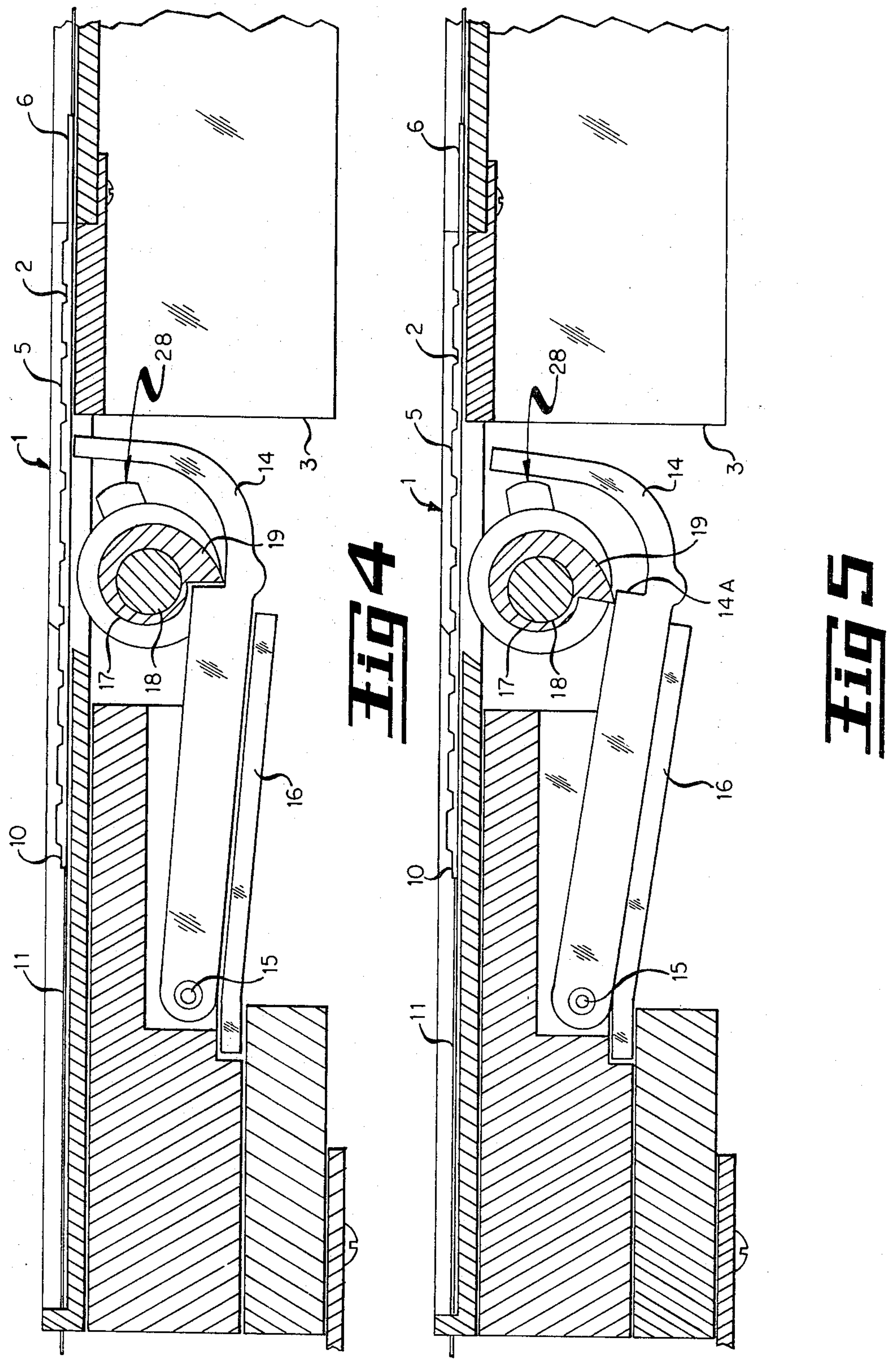
Figures 6, 7, 8:
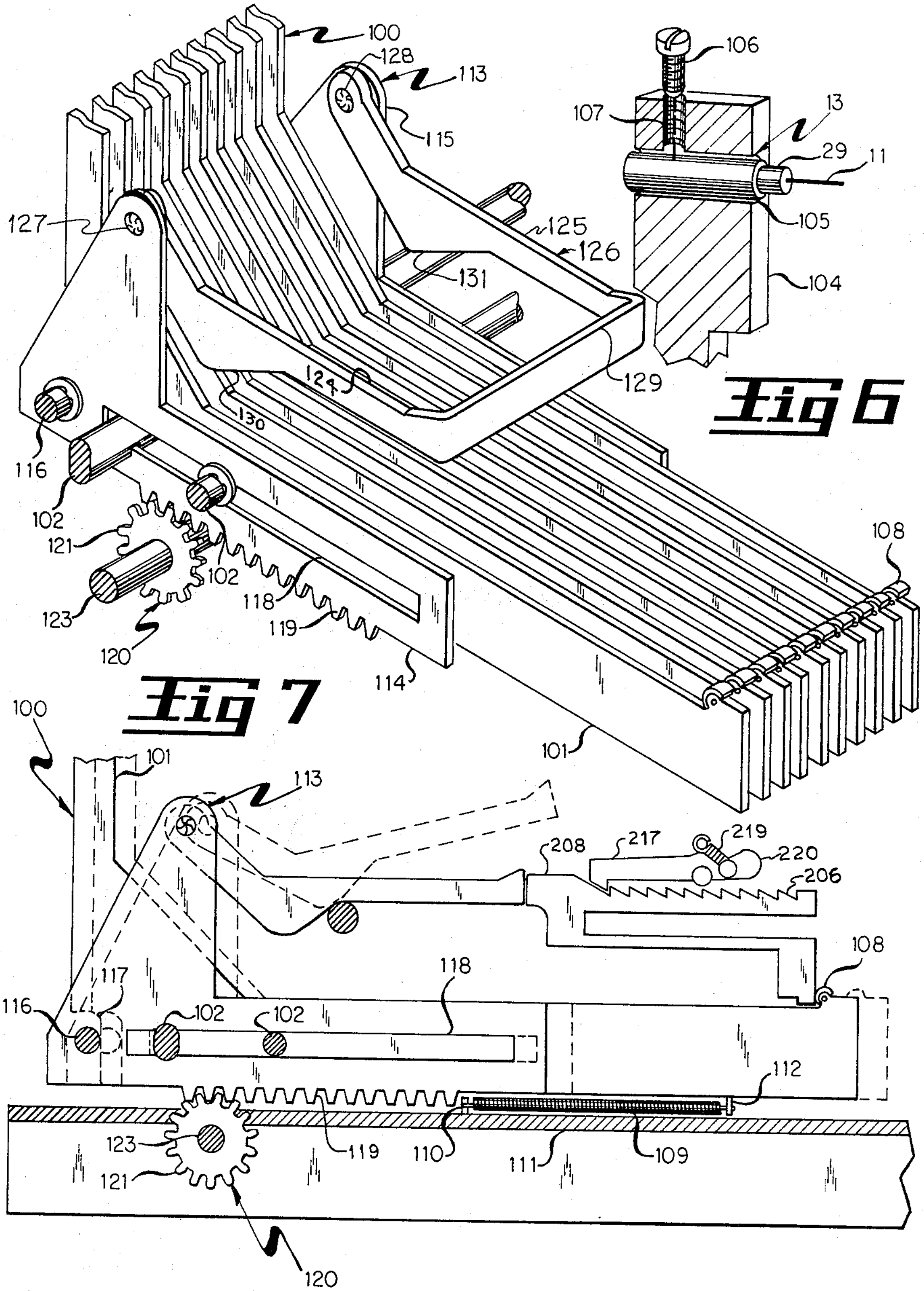
Figure 9:
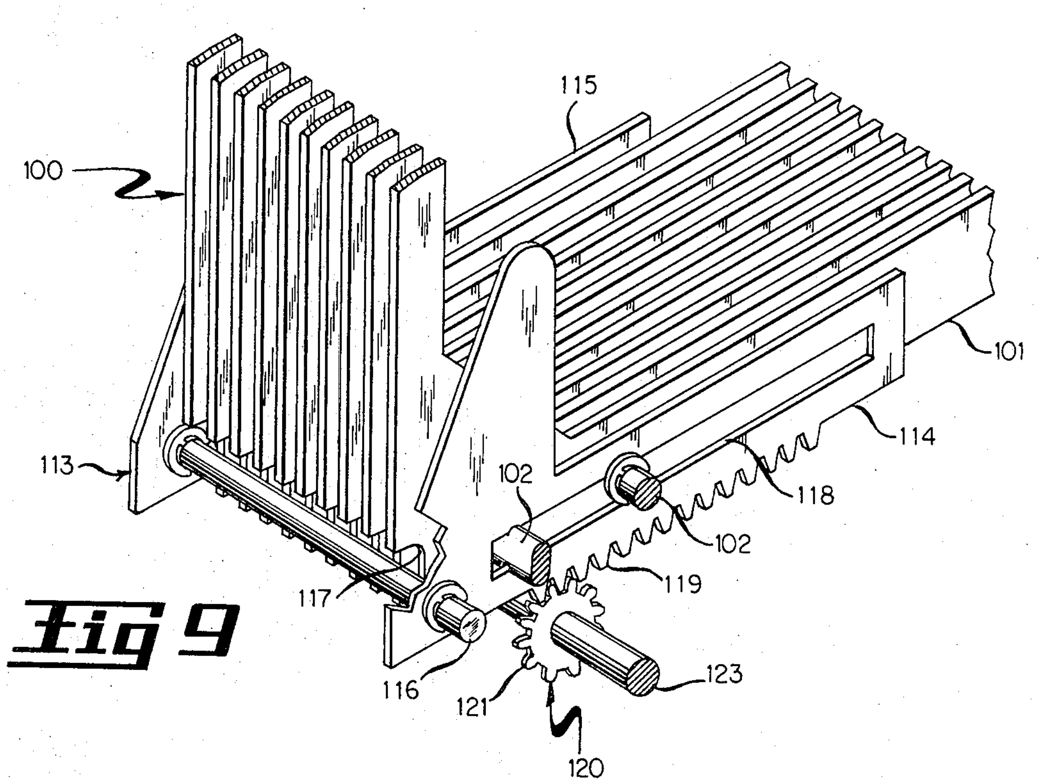
Figure 10:
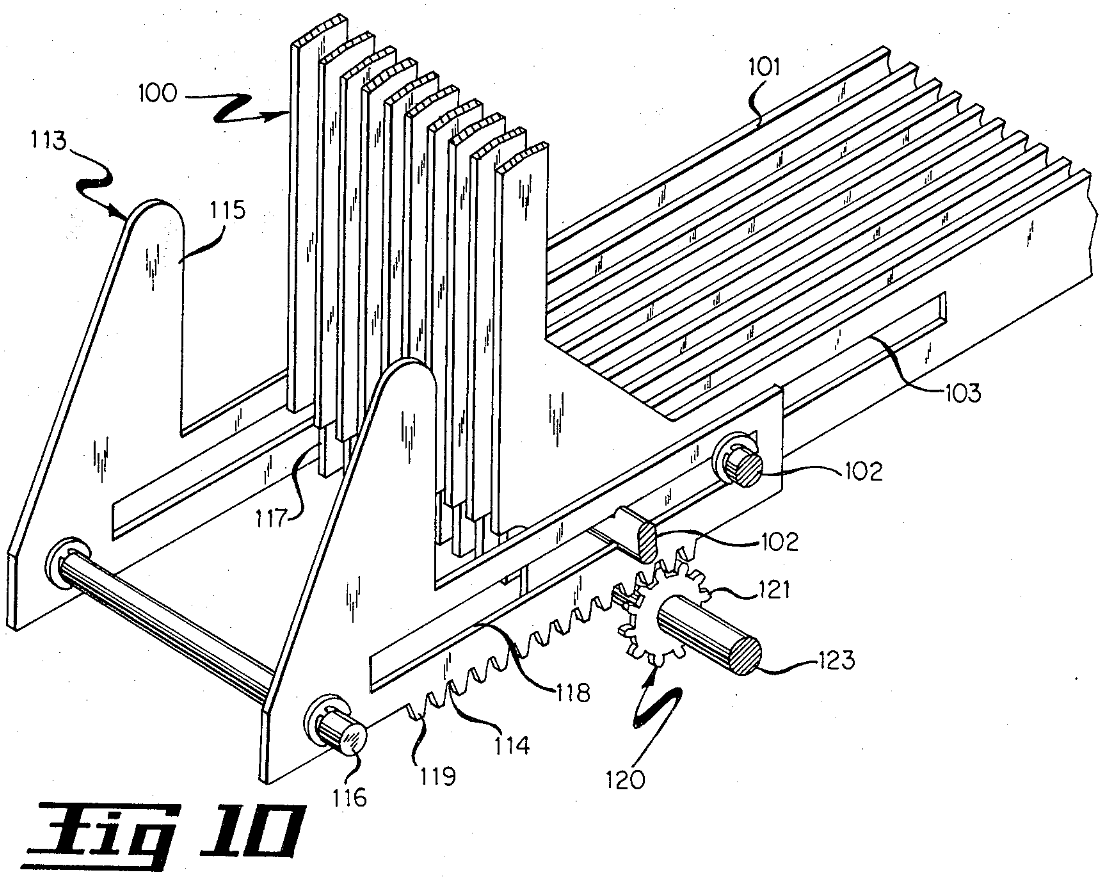
Figure 11:
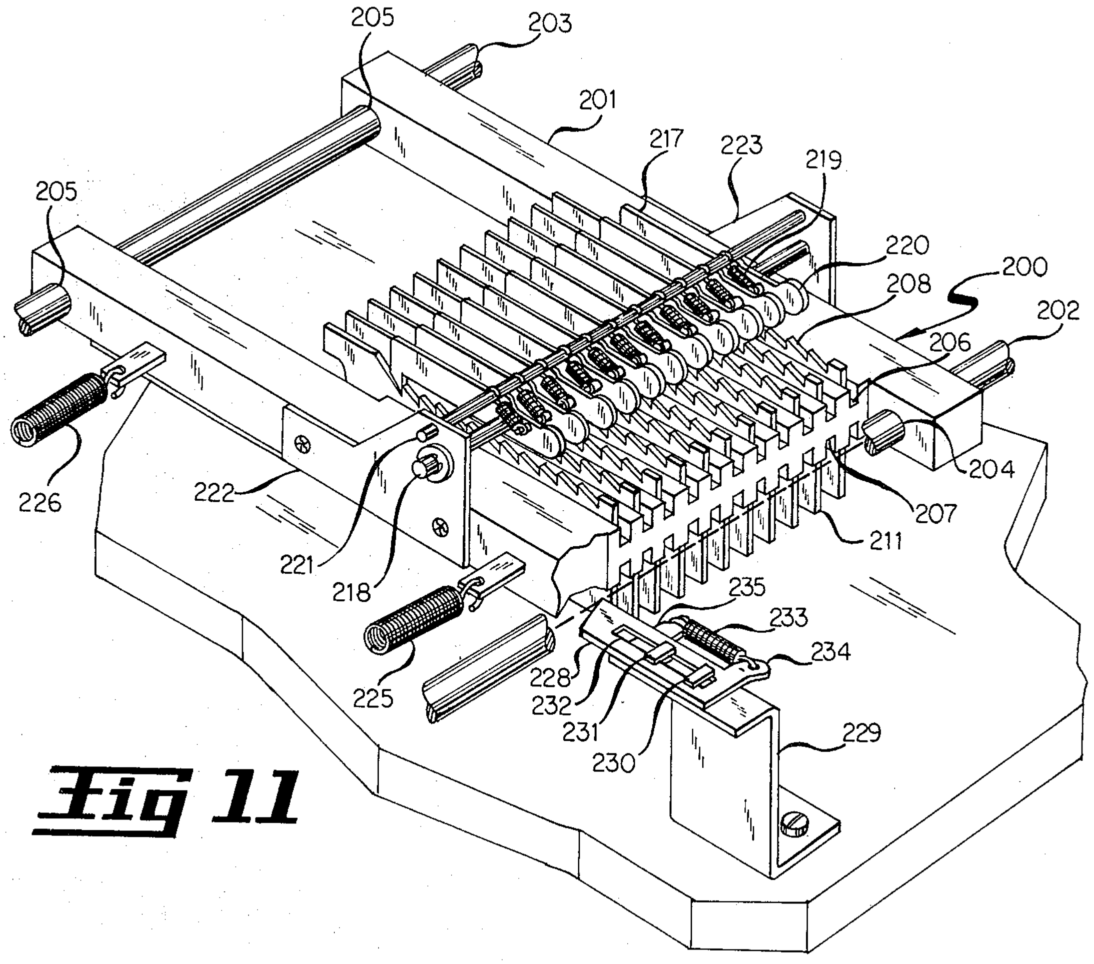
Figure 12:
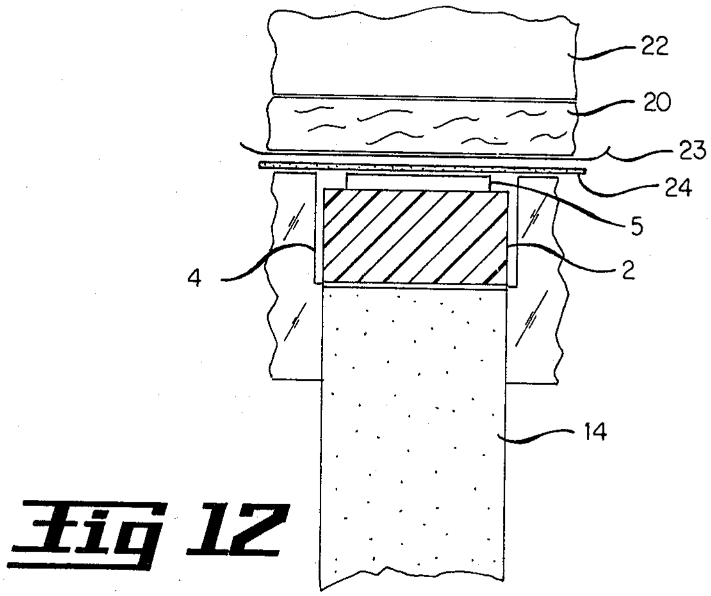
Figures 13, 14, 15:
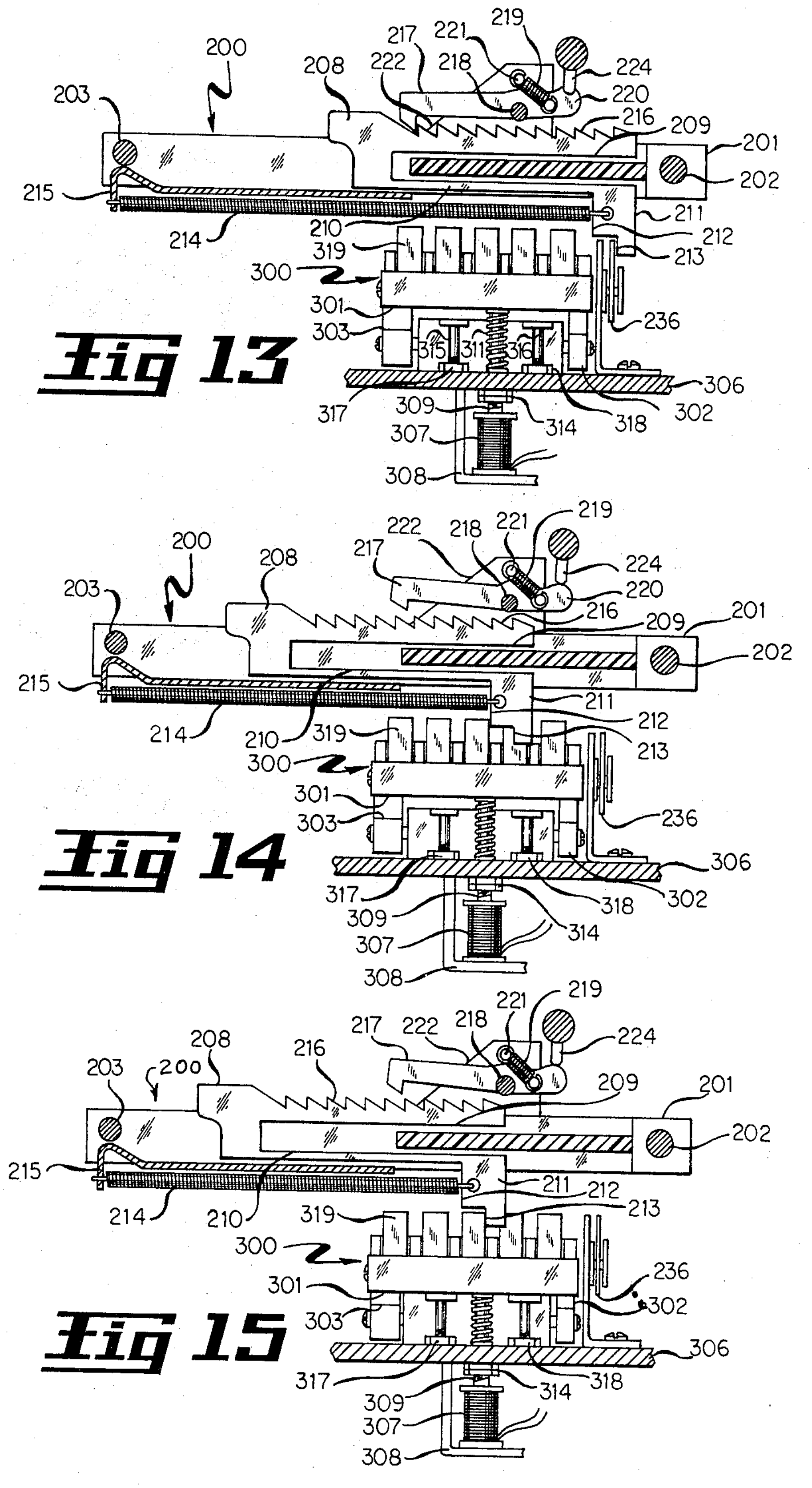
Figures 16, 17, 18, 19:
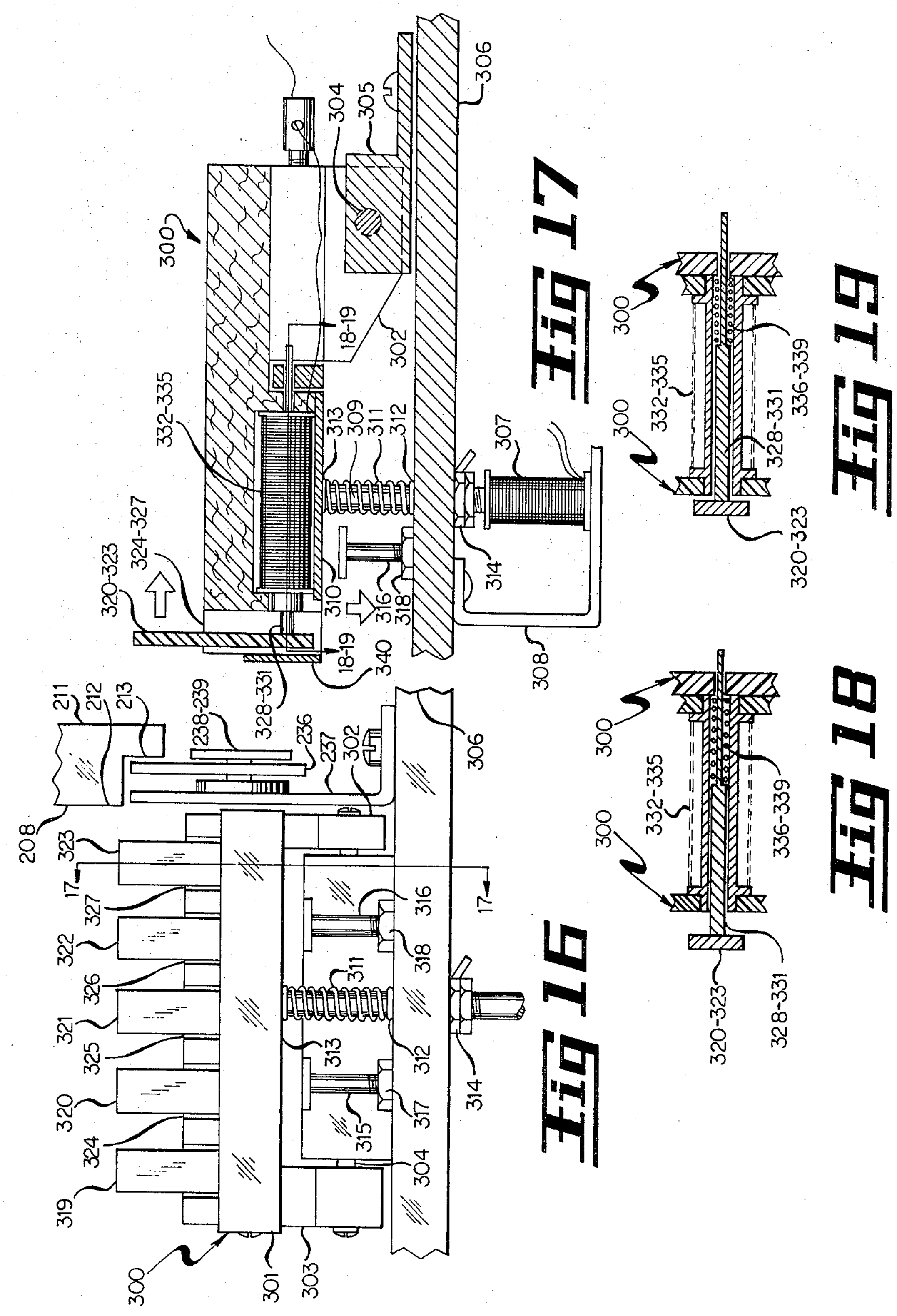
Figure 31:
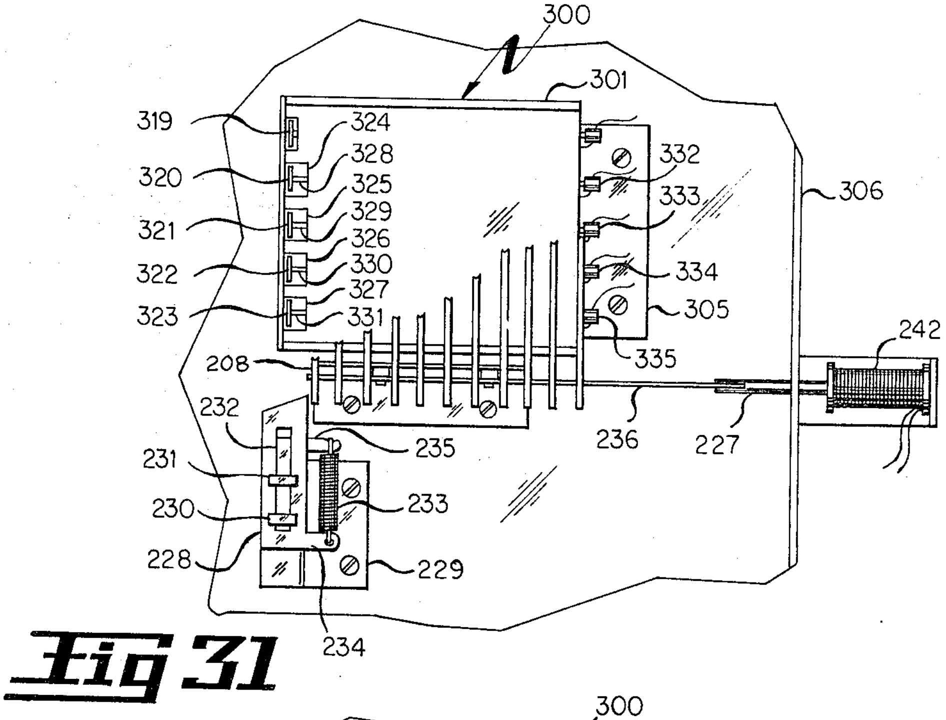
Figure 32:
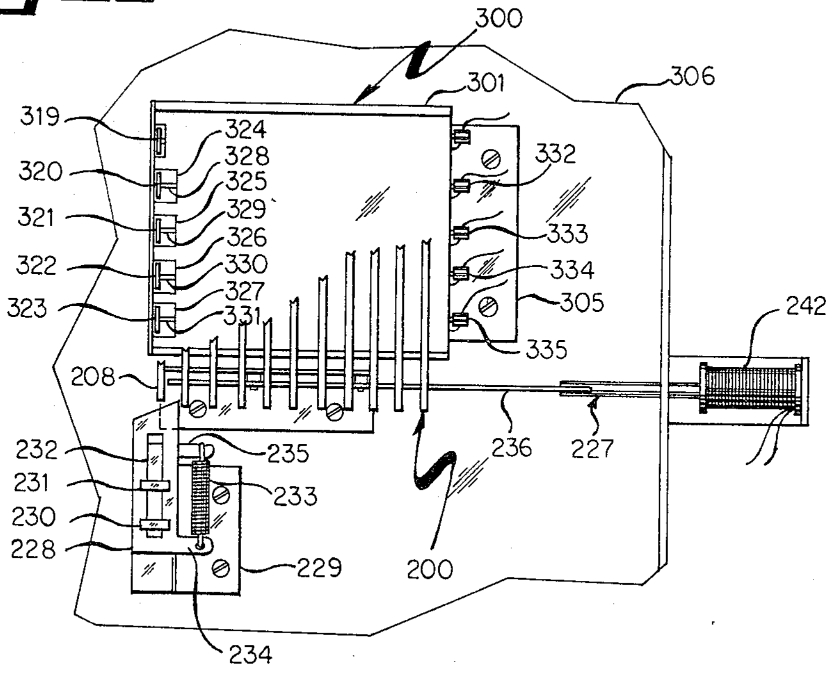
Figure 33:
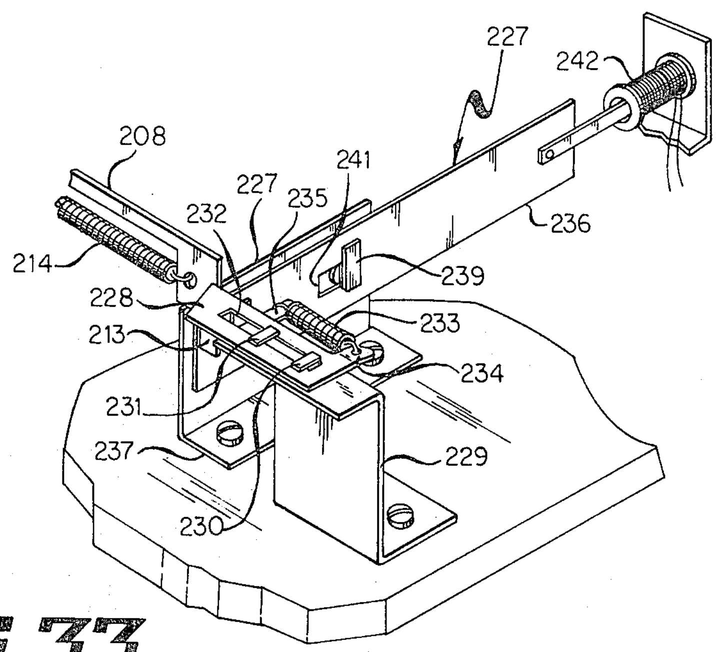
Figure 34:
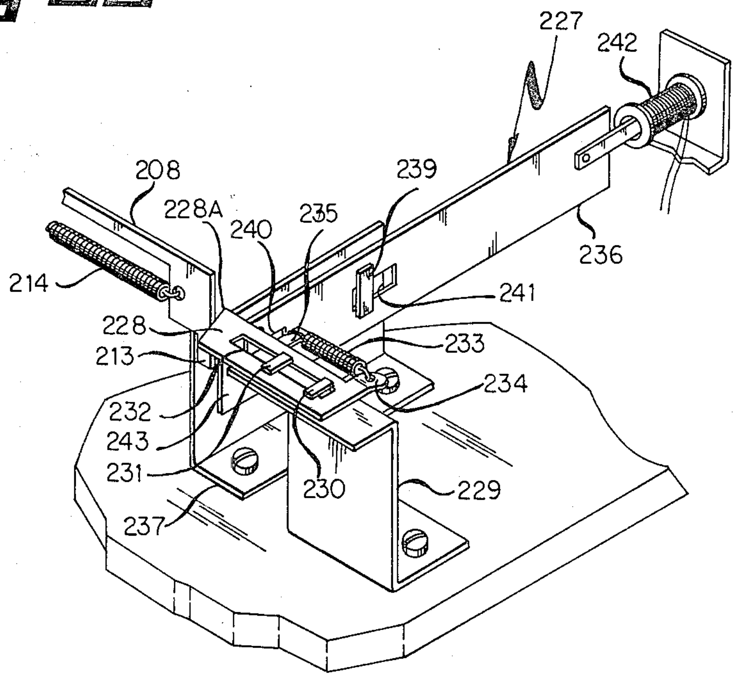
Figure 35:
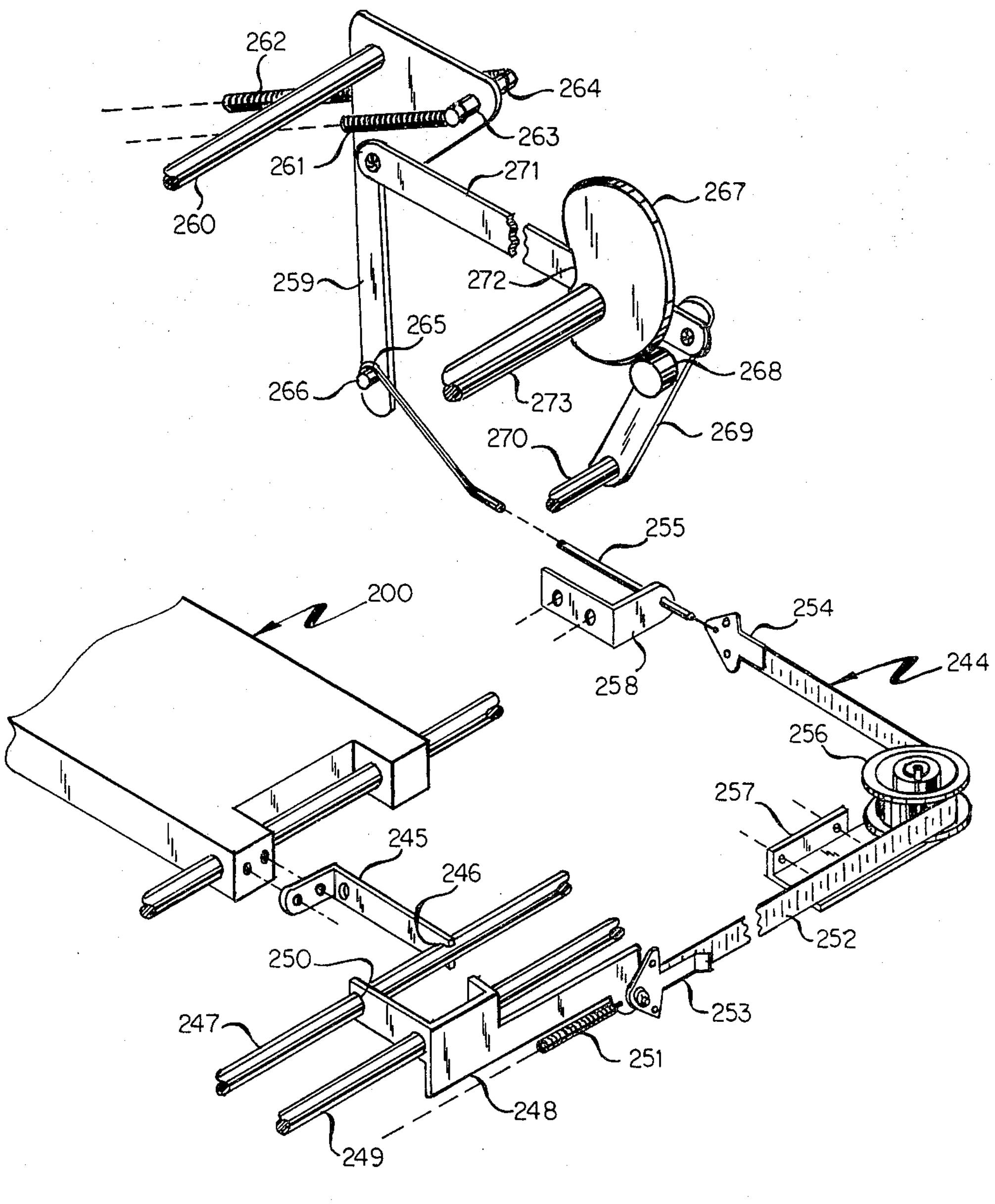
Figure 36:
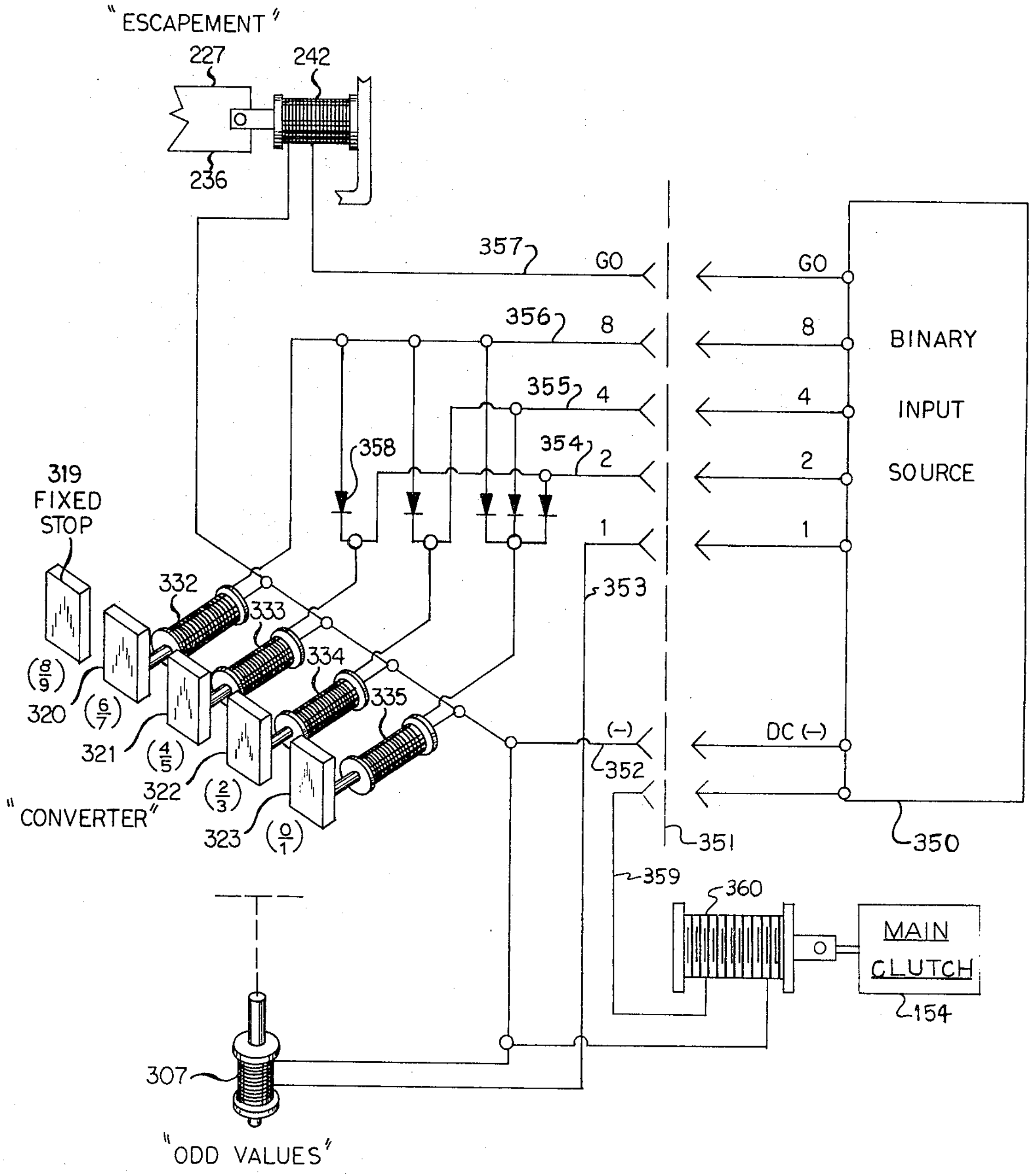

In the drawings:

FIG. 1 is a vertical section view taken longitudinally of the registering apparatus with certain parts being removed and certain parts broken away for clarity, FIG. 2 is a front elevation of the registering apparatus as seen from the right of FIG. 1, with certain elements added thereto, FIG. 3 is a partial left front fragmentary exploded perspective view of the registering apparatus with certain parts removed for clarity, FIG. 4 is an enlarged section view taken along lines 4—4 of FIG. 2, FIG. 5 is a view similar to FIG. 4 with the print hammers being shown in a retracted position, FIG. 6 is an enlarged perspective view of the print wire adjusting means with parts broken away for clarity, FIG. 7 is an enlarged left front perspective view of the rack assembly with certain parts broken away for clarity, FIG. 8 is a section view similar to FIG. 1 with certain other parts removed for purposes of clarity, FIG. 9 is a partial right rear perspective view of the rack assembly with certain parts broken away showing the rack restore mechanism in its home position, FIG. 10 is a view similar to FIG. 9 showing the rack restore assembly in its leftward escaped position, FIG. 11 is an enlarged left front perspective view of the shifting storage with certain parts broken away for clarity, FIG. 12 is an enlarged section view taken along lines 12—12 of FIG. 1, FIG. 13 is a section view taken along lines 13—13 of FIG. 2, FIG. 14 is a view similar to FIG. 13 showing one of the locator slides escaped to an even value or decimal four position, FIG. 15 is a view similar to FIG. 14 showing the input mechanism moved downward to an odd value position with one of the locator slides escaped to decimal value five, FIG. 16 is an enlarged elevation view of the input means shown in FIG. 13, FIG. 17 is a section view taken along lines 17—17 of FIG. 16, FIG. 18 is an enlarged sectional view taken along lines 18—18 of FIG. 17, FIG. 19 is a sectional view similar to FIG. 18 showing the solenoid energized with the stop moved to a non-blocking position, FIGS. 20 through 30 (which relate to FIG. 16), are partial fragmentary views of the decimal escapement of the locator slides to represent decimal settings of the print strips and rack assemblies, FIG. 31 is a fragmentary top plan of the input, shifting storage and escapement means with certain parts omitted and certain parts broken away for clarity, FIG. 32 is a view similar to FIG. 31 showing the storage means escaped one order to the left to align the highest order locator slide with the input means, FIG. 33 is an enlarged fragmentary perspective view of the escapement means showing a storage locator slide in a latched position, FIG. 34 is a view similar to FIG. 33 showing the locator slide in an unlatched or escaped position, FIG. 35 is a left front fragmentary perspective view of the storage return means with certain parts broken away and certain parts omitted for clarity, and FIG. 36 is a circuit diagram of a binary input source in combination with the receiving means shown in FIGS. 16–19.

CONTENTS

1. General Description
2. Printing Mechanism
3. Rack Assembly
4. Shifting Storage Mechanisms
   a. Escapement Mechanism
   b. Storage Return Means
5. Receiving & Input Means
6. Operation

GENERAL DESCRIPTION

Referring now in more detail to the accompanying drawings, the apparatus constructed according to the present invention comprises:

a. A PRINTING MECHANISM 1, FIGS. 1–5, for effecting a printing on paper of values contained in a storage means, b. A RACK ASSEMBLY 100, FIGS. 1–3, 7–10, c. A SHIFTING STORAGE MECHANISM 200, FIGS. 1–2, 11, 13–15, to serve as a temporary storage of decoded values, along with a STORAGE ESCAPEMENT MEANS 227, FIGS. 31–34, and a STORAGE RETURN MEANS 244, FIG. 35, d. A RECEIVING, DECODING AND INPUT MEANS 300, FIGS. 1–2, 13–19, 31–32, for receiving electrically coded signals, converting said signals into decimal values and entering said decimal values into a storage means.

Referring now particularly to FIGS. 1 and 2, the apparatus referred to above is supported relative to each other by a horizontal base frame 306, a pair of vertically oriented fore and aft side frames 150, 151 and a plurality of upstanding support brackets 152. The printing mechanism 1 is supported in a horizontal oriented vertically displaced position above base frame 306 by a plurality of upstanding support brackets 152. Rack assembly 100 is supported above base frame 306 and below printing mechanism 1 in vertical alignment with the printing mechanism by side frames 150, 151 which support opposite ends of support rods 102. Shifting storage 200 is supported between the printing mechanism 1 and rack assembly 100 by a pair of support rods 202, 203 having their opposite ends supported by side frames 150, 151. The shifting storage 200 is provided with a home position laterally displaced to the right of the rack assembly (FIG. 2) and capable of lateral movement from the home position to a lateral escaped position in vertical alignment with the rack assembly 100. The receiving, decoding and input means 300 are supported on base frame 306 in a lateral displaced position adjacent to the rack assembly 100 and below the shifting storage home position. Details of each of the sub-assemblies mentioned above will be described in more detail hereinbelow. The drive for operation of the registering apparatus is from a motor means 153 through a conventional main clutch 154 to a main program shaft 273 which operates a plurality of conventional cams and cam followers 155 (shown only in block diagram in FIG. 2) to control the cyclic operation of the related mechanism.

PRINTING MECHANISM

Referring now particularly to FIGS. 1–5, the printing mechanism 1 includes a plurality of flexible plastic print strips 2 supported for reciprocating movement in a main support block 3, which includes a plurality of strip guide channels 4 clearly shown in FIGS. 2 and 3. The print strips 2 include printing characters 5 on their top surface which represent the values 0 – 9 inclusively, plus a blank space. Each of the print strips is connected at the forward end 6 to a tension spring 7, which has its opposite end 8 connected to a transverse support rod 9. The opposite end 10 of the print strips 2 is connected to a guide wire 11 which passes through guide elements 12 and is connected to an adjustable collar assembly 13 (shown in FIG. 6 and described hereinbelow) in the upstanding end of a rack assembly.

Referring to FIGS. 4 and 5, the printing assembly further includes a plurality of print hammers 14, one for each of the print strips. The print hammers 14 are pivotally mounted on the main support block at 15. Each of the said print hammers has a leaf spring 16 contacting a rear surface which urges the print hammers 14 upwardly against the print strips 2. Supported between print hammers 14 and print strips 2 is a print cam 17, secured on a horizontal transverse print shaft 18. The print cam 17 includes a raised portion 19, which, when rotated counterclockwise as shown in FIG. 5 will force each of the print hammers downward or clockwise about their pivots 15 and against the force of the leaf spring mechanism 16. As the print cam 17 is continually rotated counterclockwise, the print hammer shoulder portion 14a will drop off of the raised cam portion 19 and will be forced upwardly by energy stored in the leaf spring assembly 16. As the print hammers 14 move upwardly the hammers will strike the bottom surface of flexible print strips 2 and force them upwardly against platen 20 (as shown in FIGS. 1 and 3). Supported directly above print hammers 14 and flexible print strips 2 is a conventional ribbon mechanism 21 having a ribbon 23. As shown in FIGS. 1, 3, and 12, a top housing member 22 overlies the print strips and ribbon mechanism with a platen 20 supported directly above the ribbon 23 and print hammers 14.

The paper 24 on which a print is being recorded passes from right to left as shown in FIGS. 1 and 3, and is guided below the ribbon mechanism and above the print strip with the leading edge 25 passing rearwardly under a paper tear-off mechanism 26 which is of transparent material to allow the print value to be viewed easily after a print is made. The paper 24 is advanced to and through the printing position by a pair of paper advance lugs 27 and 28 secured to the print cam shaft 18 as clearly shown in FIGS. 3, 4, and 5. The paper advance lugs 27 and 28 are made of a resilient material which when rotated counter-clockwise as shown in FIGS. 3, 4, and 5 will press the paper 24 against the top housing member 22 of the printing mechanism and advance the paper rearwardly one space for proper alignment to record the next printing cycle. To establish a decimal value of printing it is apparent that the flexible strips 2 must be pulled rearwardly against the tension springs 7 to a position which will place the desired printing characters 5 over the printer hammer 14. The pulling of the flexible print strip is accomplished through the flexible guide wire 11 and rack assembly 100 which will be described hereinbelow.

RACK ASSEMBLY

Refer now to FIGS. 2 and 6–10. The rack assembly 100 includes 10 ordinal series of racks 101 which are supported for reciprocating movement on a pair of guide rods 102 which pass through a slot 103 (FIG. 10) in each of the racks. Each of the racks is connected to a print strip 2 by an adjustable collar assembly 13 (see FIG. 6), supported in an upstanding end 104 of each of the racks. The adjustable collar assembly 13 includes a bushing 29 (FIG. 6), which is anchored to one end of the print strip wire and passes through an opening 105 in the upstanding rack arm 104. A set screw 106 is threaded into the opening 107 against the bushing 29 for securing said bushing in a desired adjusted position. Referring now particularly to FIGS. 1 and 7, each of the racks 101 includes a stop assembly 108 in the form of an upstanding shoulder portion located in the right end of each of the racks as seen in FIGS. 1 and 7. Each of the racks has a tension spring 109 which is connected between an upstanding ear 110 on the bottom frame 111 and a depending ear 112 on each of the racks (See FIG. 8). The spring 109 will urge each of the racks 101 to the left as seen in FIG. 8.

The racks are held to the right or in their home position by means of a restore rack assembly 113 which includes a pair of restore racks 114 and 115, one being located on each side of the rack assembly as shown in FIGS. 7–10. The restore rack assembly 113 further includes a transverse connecting rod 116 located between the rear edge of the restore racks. The transverse connecting rod 116 will abut against a rear shoulder portion 117 on each of the racks for holding them in their rightward or homeward position. The restore racks are supported on guide rods 102 passing through an elongated slot 118. Located on the bottom edge of each of the restore racks is a rack segment 119 which is in mesh with a gear assembly 120 as clearly shown in FIGS. 1 and 7–10. The gear assembly 120 includes a pair of gears 121 and 122 fixed to a restore rack drive shaft 123 supported in the main frame which when rotated clockwise, as shown in FIGS. 1, 2, and 7–10, will move all of the print control racks to the right or their home position as shown in FIG. 9. When it is desired to allow the racks to move to the left to effect a printing position, the restore rack assembly is allowed to move to the left by a counter-clockwise rotation of the restore rack gear assembly to a position as shown in FIG. 10. This will allow each of the print control racks 101 to move to the left, and thus through the flexible wire 11 pull the flexible print strips 2 to a printing position overlying the print hammers 14. The control of the print racks as they move to their left to effect a printing position is effected by a shifting storage mechanism 200, which will be described hereinafter below.

Connected to an upstanding portion 124 and 125 of the restore racks 114, 115, respectively, is a rack locator slide restore bail 126 which will be described in more detail herein below in the description of the shifting storage mechanism.

SHIFTING STORAGE MECHANISM

Referring now particularly to FIGS. 11, 13–15, the shifting storage mechanism 200 includes an integral support block 201 supported for lateral movement on a pair of transverse support rods 202 and 203 which pass through openings 204 and 205 in said support block. The storage support block 201 includes a plurality of upper guide channels 206 and lower guide channels 207, as clearly shown in FIG. 11, for supporting a plurality of rack locator slides 208 for reciprocating movement. Each of the rack locator slides includes a top portion 209 which is guided in the upper guide channel 206 and a bottom portion 210 which is guided in the lower guide channel 207. As seen in FIGS. 11, 13 and 14, the rack locator slide bottom portion 210 includes a depending arm 211 which has a first and a second shoulder portion 212 and 213, respectively. A tension spring 214 is connected to the depending arm 211 of each of the rack locator slides at one end and is anchored on the opposite end to an anchoring plate 215 which is fixed to the storage support block 201. The spring 214, connected to the rack locator slides 208, will urge the slides to the left as shown in FIGS. 11, 13 and 14. Each of the rack locator slides has located on a top portion 209 thereof a plurality of ratchet teeth 216, one to represent each of the printing characters included in the print strip 2.

The rack locator slides 208 are held to their right or homeward position by means of individual latches 217 which are pivotally supported on a transverse pivot shaft 218. Latches 217 are urged counter-clockwise (as seen in FIGS. 11, 13, 14) into engagement with the ratchet teeth 216 of the locator slides by means of individual tension springs 219 which are shown in FIG. 11. The springs 219 are connected to a rearwardly extending portion 220 of said latches and are connected at their opposite ends to a transverse anchor rod 221. The pivot shaft 218 for each of the latches and the anchor rod 221 are supported in a pair of upstanding plates 222 and 223, which are fixed to opposite sides of support block 201, as clearly shown in FIG. 11. When it is desired to allow one of the locator slides to move to the left to establish a rack locator position, a camming element 224 (FIGS. 2 and 13–15) located above a rearwardly extending or camming portion 220 on each of the latches will cam the latch to an unlatched position as shown in FIG. 14. This will allow the locator slides to move to the left by means of the tension spring 214 to establish a locator position. After the rack locator slide 208 has moved to the position to affect a locating position, the latches 217 will be released again to engage the ratchet teeth 216 to secure the slides in a set position.

Cam element 224 is mounted on a shaft 224a and supported in side frames 150, 151 at a position directly above shifting storage 200 and latches 217. The left end (FIG. 1) of shaft 224a is controlled for oscillating movement from a camming position (FIGS. 13-15) to a non-camming position (FIG. 1) by operation of the main program shaft 273 through conventional means such as cams and cam followers (not shown). As the shifting storage 200 escapes to the left (FIG. 2) to effect entry of a decimal value representation, the cam element 224 must be in a camming position as shown in FIGS. 13–15 to allow cam element 224 to release latches 217. In restoration of the shifting storage 200 to a rightmost or home position (FIG. 2) after a printing operation, cam shaft 224a must be controlled by program shaft 273 to move cam element 224 to a non-camming position (shown in FIG. 1) to allow latches 217 to bypass cam 224. After the shifting storage 200 has returned to the home position, cam shaft 224a is again moved to bring cam 224 to a camming position in order to be in position for the next printing cycle. Referring now particularly to FIG. 2, the lateral dimension and position of cam 224 is detailed such that each latch 217 is individually released by cam 224 (FIGS. 14, 15) as the shifting storage 200 escapes to the left. It is necessary that the latches 217 be released from the cam 224 and allowed to return to a latching position relative to the locator slides 208 in order that the slides 208 will assume a latched set position before the rack locator slides 208 escape to the left (FIG. 32) or move off of the stop elements 319, 320, etc.

Restoration of the rack locator slides 208 from a leftward displaced position rightward to a home position (as seen in FIGS. 8 and 11–15) is accomplished by a rack locator slide restore bail 126 (FIG. 8) which is connected to and movable with rack restore assembly 113. The rack locator slide restore bail 126 is substantially U-shaped and includes a pair of leg portions 124, 125 pivotally connected at 127, 128 to the restore racks 114, 115, respectively (FIG. 7). Bail 126 includes a transverse portion 129 connecting leg portions 124, 125. Transverse portion 129 is detailed to span and engage all the rack locator slides 208 which have moved to a digit setting position. As the restore bail 126 moves rightward (FIG. 8), bail transverse portion 129 will contact a leftward edge of any displaced locator slide 208 and will move the contacted slides 208 rightward until the slide latches 217 engage and become latched with the leftmost ratchet tooth 216 (FIG. 8). When the locator slides 208 are latched in a home position, a continued movement of bail 126 will cause a bail camming portion 130, 131 to contact bail disengagement shaft 132 thereby camming bail 126 to an elevated position (shown in dotted lines in FIG. 8) above slides 208.

The shifting storage mechanism includes an ordinal series of slides, one for each of the racks 101 and each of the print strips 2. The shifting storage 200 is normally held in position to the right as shown in FIG. 2, or out of engagement with any of the racks. The shifting storage is urged to the left by a pair of tension springs 225 and 226 (FIG. 11) which are connected at one end to the shifting storage support block 201 and are connected at their opposite end to a left frame portion (not shown). Movement of the shifting storage to the left is blocked by an escapement mechanism 227 which will be described hereinbelow.

ESCAPEMENT MECHANISM

Referring now particularly to FIGS. 11 and 31–34, the shifting storage mechanism 200 is blocked from leftward movement thereof by a fore and aft movable stop slide 228 which is in abutting relationship with the leftmost locator slide 208, as clearly shown in FIGS. 1, 11, and 33. The fore and aft stop slide 228 is supported for fore and aft reciprocating movement on an upstanding frame member 229 by means of a pair of support lugs 230 and 231 which pass through a slot 232 in the fore and aft stop slide 228. The fore and aft stop slide 228 is urged to the left as shown in FIGS. 11, 33, 34 by means of a tension spring 233 which is connected at one end to an ear portion 234 on said fore and aft slide 228 and is connected at the opposite end to an ear portion 235 on the upstanding frame member 229.

Referring now particularly to FIGS. 2, 13, and 33 it can be seen that the locator slide 208 of the shifting storage 200 which has a second shoulder portion 213, is in abutting and slidable engagement with a transverse or laterally movable stop slide 236, and is blocked against lateral movement by means of the fore and aft stop slide 228. Further, the locator slide 208 is blocked from leftward movement by means of a laterally movable stop slide 236 which is supported upon an upstanding frame bracket 237 by means of a pair of support lugs 238 and 239 which pass through a pair of slots 240 and 241. The right end of the laterally movable stop slide 236 as shown in FIGS. 2 and 31–34 is connected to a solenoid 242, which when energized will move the laterally movable stop slide 236 to the right to affect an escapement of the shifting storage. As can be seen in FIGS. 32 and 34, when the laterally movable stop slide 236 is moved to the right by energization of solenoid 242, the stop slide 236 will be moved to the right enough to affect a disengagement with the second shoulder portion 213 of the locator slide 208. At this point the locator stop slide 208 will be pulled to the left, as shown in FIG. 34, by the tension spring 214. The second shoulder portion 213 of the locator stop slides 208 will then be in abutting relationship with the frame element 237, as shown in FIG. 34. In this position the locator stop slide 208 has been allowed to move forward or to the left enough to be able to pass by the forward extension 228a (FIG. 34) of the fore and aft stop slide 228, and this extent of movement will allow the shifting storage assembly 200 to be pulled to the left by tension springs 225 and 226 (FIG. 11) until the second locator slide 208 contacts the fore and aft stop slide 228 (FIG. 32). This will affect a one order escapement of the shifting storage to place the first locator slide in a position to receive an input clearly shown in FIG. 32. At this time a value will be established in the input mechanism to position the locator stop slide. After each input has been received and established, a signal will be received to the solenoid 242 to move the laterally movable stop slide 236 to the right to affect an additional escapement of the storage mechanism to the left. This escapement and input position of the locator stop slide is affected for each order of the decimal value to be printed.

STORAGE RETURN MEANS

Referring now particularly to FIG. 35, a means 244 is shown for returning the shifting storage mechanism 200 from its leftward escape position rightward to its home position. Fixed to the shifting storage 200 is a storage stop bracket 245 which extends forwardly and has a notch portion 246. The stop bracket 245 controls the extreme leftward position of the storage 200. The notch portion 246 is mounted for sliding engagement with a fixed rod 247. A clearance slide 248 is supported on a fixed rod 249 and includes a notch portion 250. The clearance slide 248 is urged to the left as shown in FIG. 35 by a spring 251 which is connected at one end to a frame portion (not shown) and connected at the other end to a clearance slide 248. The storage stop bracket 245 and bracket notch portion 246 are located on the rod 247 in such a manner that movement of the clearance slide 248 to the right will affect a corresponding movement of the storage 200. The clearance slide 248 is moved rightward by means of a draw band 252 which is connected by a connecting element 253 to the clearance slide 248 on one end and connected by element 254 to a movable rod 255 on the other end. A guide pulley 256 engages an intermediate portion of the draw band 252 for changing the direction of movement of the draw band from a transverse direction to a fore and aft direction. Guide pulley 256 is mounted for rotation on a roller support bracket 257 which is connected to a frame portion (not shown). The rod 255 is guided by a support element 258. The fore and aft movement of the rod 255 is controlled by a clearance lever 259 which is pivotally mounted on shaft 260 and urged in a clockwise direction about shaft 260 by a pair of tension springs 261 and 262 which are connected at one end to a frame portion (not shown) and connected at the other end to clearance lever stud elements 263 and 264. The lower end of clearance lever 259 is connected to rod 255 by hook 265 and stud 266. Movement of the clearance lever 259 in a clockwise direction is blocked by a cam 267 which engages a roller 268. The roller 268 is journaled on a roller lever 269 which is pivotally mounted on shaft 270 at one end and connected by a link 271 to the clearance lever 259 at the other end. The cam 267 includes a notched portion 272 which will cooperate with roller 268 to allow rotation of the clearance lever 259 about shaft 260 which will in turn pull the rod 255 rearwardly causing a rightward movement of clearance slide 248 on rod 249 to effect movement of the storage 200 rightward to its home position. The cam 267 is mounted on the machine program shaft 273 which is controlled by a conventional machine clutch mechanism (not shown) during the cycling of the machine.

RECEIVING AND INPUT MEANS

Referring now particularly to FIGS. 1, 13–17, and 31–32 receiving and input means 300 includes a block assembly 301, which has a pair of detenting leg portions 302 and 303. Input means 300 is pivotally supported on a shaft 304, which passes through a pivot block 305, and which is supported on a horizontal base frame section 306. The input support block assembly 301 is moved about pivot shaft 304 by means of a solenoid 307 which controls the input of odd values. Solenoid 307 is supported on a bracket 308, secured to the underside of the horizontal base frame 306. The solenoid armature 309 passes through an opening in the horizontal base frame 306 and is secured at its upper end to a plate 310 (see FIG. 17), which is fixed to the underside of the input support block assembly 301. A compression spring 311 passes around the armature 309 between the upper surface 312 of support frame 306 and between the underside 313 of the input support block assembly 301 (see FIG. 16) to urge support block assembly 301 upward or clockwise as shown in FIG. 17. The extent of upward movement of support block assembly 301 is controlled by an adjustable nut mechanism 314 which is fixed to the solenoid armature 309 immediately below horizontal base frame 306. It can be seen that by energization of solenoid 307 that the input support block assembly 301 will be rotated counterclockwise about pivot shaft 304. The extent of downward movement of input support block assembly 301 is controlled by a pair of adjustable screw assemblies 315 and 316 which are threaded into the top surface of horizontal base frame 306 and are held in a fixed position by a lock nut 317 and 318. The input mechanism includes one fixed stop 319 and four movable stops 320, 321, 322, and 323 which are supported for lateral movement in notches 324, 325, 326, and 327 respectively on support block assembly 301. Referring now to FIGS. 17 and 18, each of the movable stops 320 through 323 is connected to the armature 328 through 331 of a solenoid 332 through 335. The stops 320 through 324 are urged to the left or in a blocking position by means of compression springs 336 through 339 (FIGS. 18, 19). Energization of any of the solenoids will cause movement of its associated stop member to the right, as seen in FIGS. 17 and 18, to a non-blocking position. The leftward extent or movement of the stop as seen in FIG. 17 is controlled by a band 340 which passes around the left end of the input support block assembly 301 to trap the stops within the cavity framed by the support block notches and band. The input mechanism described above is adapted to receive binary coded values and to convert these binary coded vales into decimal displacement of the rack locator stop slides 208 which will establish a decimal printing position for the print strips 2. As has been described above in the shifting storage mechanism, the locator stop slide 208 includes a first and a second shoulder portion 212 and 213 respectively (shown in FIGS. 13 through 15). When the locator stop slide 208 has been escaped to a position to receive an input it is in direct fore and aft alignment with the stops 319 through 323. The leftward movement (FIGS. 13 through 15) of the rack locator stop slide 208 would therefore be blocked by whatever stops 319 through 323 are in the path of a locator stop slide 208. Therefore, by energization of solenoids 332–335, selected ones of said stops can be moved to the right (as seen in FIG. 19) out of the path of the locator stop slide 208. Referring now particularly to FIGS. 13 through 15, it can be seen that as a locator stop slide 208 is moved to the left by spring 214, that the first stop in the path of the locator stop slide 208 will contact and abut against the first shoulder portion 212 of said locator stop slide. Energization of solenoid 307, which controls odd values, will rotate the input support block assembly 300 downward about pivot shaft 304. This movement would position the top edge of the stops 320–323 below the first shoulder blocking surface 212 of the locator stop slide 208 and would allow the locator stop slide 208 to move forward one additional value until the second shoulder blocking surface 213 contacts one of the stops that is positioned in the path of said locator stop slide 208. Therefore, it can be seen that by receiving electrical pulses to energize combinations of the solenoids 332 through 335 to move certain combinations of the stops to the right as seen in FIG. 19 to a non-blocking position, and that by receiving an electrical pulse to energize solenoid 307 to control odd values, that any of the decimal values 0 to 9 inclusively can be established to locate the locator stop slides 208 to any of the decimal values to establish a printing position of any of the decimal values on the print strips 2.

OPERATION

Figures 20, 21, 22, 23, 24, 25, 26, 27, 28, 29, 30:
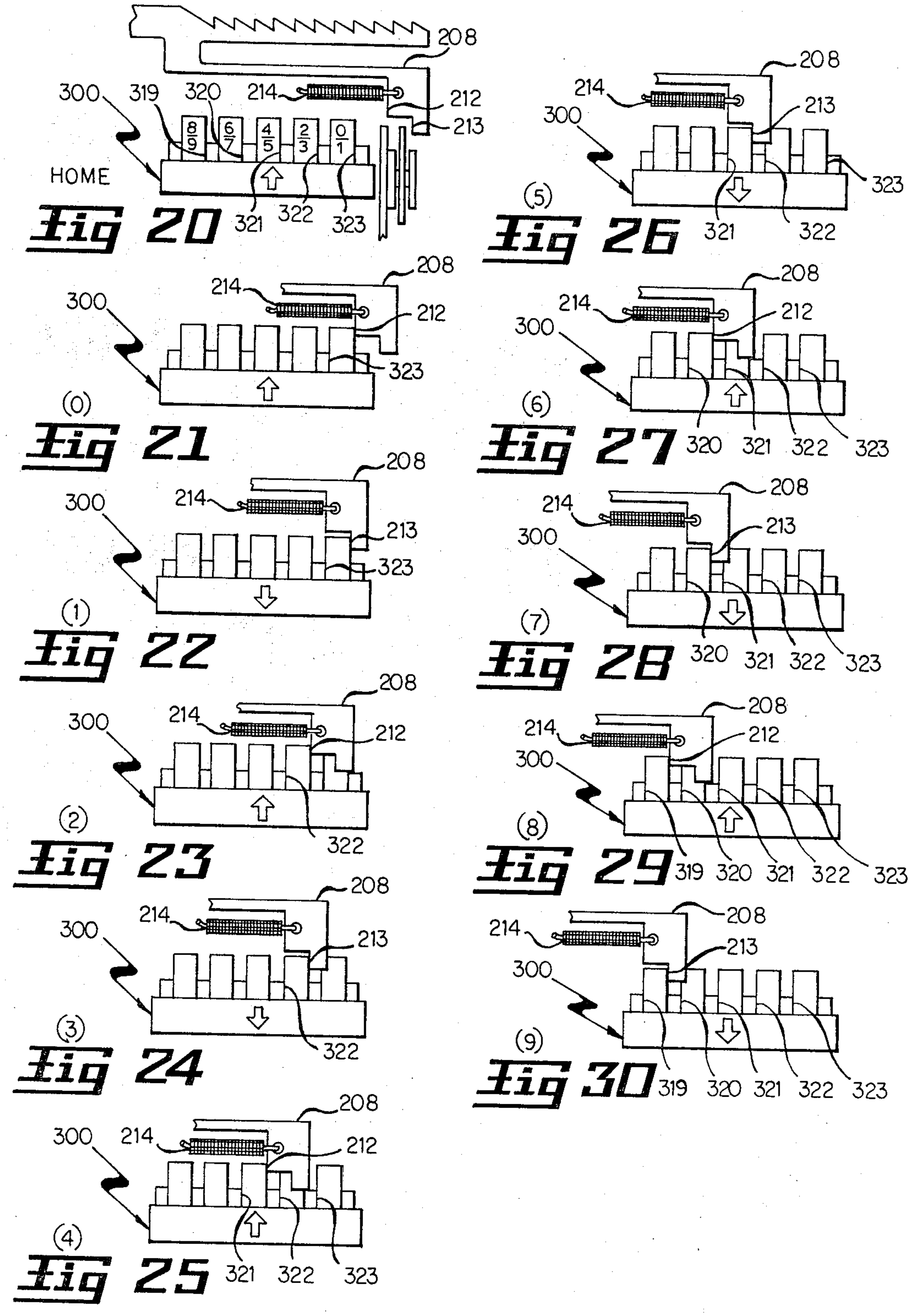

In operation, when the storage assembly 200 has been moved to the right or to the homeward position and before a first input can be received to establish a decimal value in the locator stop slide 208, a signal must be received in the escapement solenoid 242 to allow the first stop slide to be escaped to the left to be in fore and aft alignment with the input stops as shown in FIGS. 20 and 32. After the storage assembly 200 has been escaped to the left to bring the locator stop slides 208 in alignment with the stops 320–323, the first stop slide 208 will be advanced to the left as shown in FIG. 21 to a position where the first blocking surface 212 on the stop slide 208 will contact the first stop 323 which will represent a zero position of the print strip and control rack. To establish a one value of decimal printing it would then be necessary to receive a signal in solenoid 307 to cause the input support or block assembly 300 to move downwardly against the stops 315 and 316 by means of the solenoid 307. This would then allow the locator stop slide 208 to move to the left one additional decimal value to bring the second blocking surface 213 into contact with the first stop 323, as shown in FIG. 22. This would then represent a one decimal value. To establish a decimal value two, a signal would be received to energize solenoid 335 to move the first stop to the right or to a non-blocking position. This would allow the locator stop slide 208 to move to the left until the slide first blocking surface 212 contacts the second stop 322, as shown in FIG. 23; this would represent a decimal value two. To establish a decimal value three, a signal would be received to move the first stop slide 323 to a non-blocking position and a signal would be also received to energize solenoid 307 to rotate the input support block assembly 300 downward, thus allowing the stop slide 208 to be moved further to the left to allow second blocking surface 213 to contact the second stop 322, as shown in FIG. 24. This would represent the decimal value three. The decimal value four is established by receiving a signal to move both stops 323 and 322 to the right or to a non-blocking position, thus allowing the locator stop slide first blocking surface 212 to come into contact with the stop 321 to establish a decimal value four, (See FIG. 25). To establish a decimal value five a signal would be received to move stop 322 and 323 to a non-blocking position an a signal would also be received to energize the odd value solenoid 307 to rotate the stop assembly 300 downward so that the first blocking surface 212 on the stop slide 208 would be disengaged and allow the second blocking surface 213 to contact the stop 321 to represent a decimal value five as shown in FIG. 26. The decimal value six is established by moving stops 321, 322, and 323 to the right to a non-blocking position to allow the stop slide first blocking surface 212 to contact stop 320, as shown in FIG. 27. The decimal value seven is established by moving stops 321, 322, and 323 to the right to a non-blocking position, plus receiving a signal in the odd value solenoid 307 to rotate the input block assembly 300 downward to allow the first blocking surface 212 to escape above stop 320 to allow the second blocking surface 213 to contact thereagainst, thus representing the decimal value seven, as shown in FIG. 28. The decimal value eight is established by moving all four of the movable stops (320, 321, 322, and 323) to the right to allow the locator stop slide 208 to move to the left until the first blocking surface 212 contacts the fixed stop 319. This will establish a decimal value eight, as shown in FIG. 29. The decimal value nine is established by again moving all four movable stops to the right or to a non-blocking position, and also receiving a signal to energize the odd value solenoid 307, which will rotate or move the fixed stop 319 downward to allow slide first blocking surface 212 to escape over the top of the stop and allow the slide second blocking surface 213 to contact thereagainst to represent the decimal value nine, as shown in FIG. 30. Thus, it is seen that by controlling the input signals representing a binary code that the binary code can be translated into decimal values of output to effect a decimal value of print on a paper by means of the print strips as has been described hereinabove.

FIG. 36 is a combination isometric-schematic type drawing which represents the electrical circuit necessary to operate the various solenoids, and to show the conversion of binary input data to decimal mechanical displacement values. A binary input source is represented by a box numbered 350; input leads are included the conventional 1, 2, 4, and 8 signal source leads, plus a "go" source and a "DC return or minus" source. Dashed line 351 represents a plug-in connection and demonstrates that the binary input source may be external to the instant unit being described.

Still referring to FIG. 36, lead 352 represents the DC return of minus source and is common to the winding of all solenoids. Lead 353 is a binary one source and is connected to the "odd-value" solenoid 307. Lead 354 is a binary two source and is connected to solenoids 335 and 333. Lead 335 is a binary four source and is connected to solenoids 335 and 334. Lead 356 is a binary eight source which is connected to all four solenoids 332–335. Lead 357 is a "go" signal source and is connected to solenoid 242, which controls the escapement of input means 300. Lead 359 is a "print" signal source and is connected to a solenoid 360 which controls operation of a conventional main clutch 155 (FIG. 2) for cycling of main program shaft 273. Blocking diode 358 is typical of a plurality of diodes which are shown employed in a standard manner to block DC current values where required to prevent feedback into adjacent solenoids. The operation of all solenoids shown in FIG. 36 have been described hereinbefore.

Based on the foregoing circuitry description it will be obvious that binary input sources 1, 2, 4, and 8 will be pulsed in the standard manner in accordance with decimal input equivalents, and will operate solenoids as hereinbefore described. Solenoid 242 will be pulsed substantially simultaneously with binary input data to provide for escapement as each "order" locator slide 208 is released to sense on preselected stops 319–323.

The above detailed description of the operations outlines the manner in which a decimal value 0–9 may be established as the result of receiving a binary coded signal. It will be recalled that solenoid 242 serves to escape the shifting storage to the next ordinal position to effect a new entry and the escapement solenoid 242 will be actuated for each digit of the decimal value to be printed.

Upon completion of the setup of the digits representing a value to be printed, a print signal is received to energize solenoid 360 to open the main clutch 361 to allow cycling of the main program shaft 273 to perform in a timed sequence the steps of (1) allowing the racks 101 to move rearwardly to position the related print strips 2 to a print position, (2) relating the print shaft 18 to effect a printing operation, (3) restoring the racks 101 and locator slides 208 to a home position, (4) rotating cam element 224 to a non-camming position, (5) returning shifting storage 200 to a home position, and (6) rotating cam element 224 back to a camming position. The print operation consists of a reciprocation of the racks 101 as above described and during the rearward excursion of racks 101, the extent of movement is limited by the previously set rack locator slides 208 which have been set by the above described binary decoding means.

The present invention thus provides a printing system, operable from either an internal or external code producing unit, which is capable of serially receiving and converting into decimal value of representation a set of coded information, entering said decimal value representation into a shifting storage means and effecting a printing in parallel of the decimal value contained in said shifting storage.

While the form of the apparatus herein described constitutes a preferred embodiment of the invention, it is to be understood that the invention is not limited to this precise form of apparatus, and that changes may be made therein without departing from the scope of the invention as defined in the appended claims.

What is claimed is:

1. A registering apparatus comprising:

a) means supported on said registering apparatus for receiving input information represented in a first predetermined code form;

b) decoding means supported on said registering apparatus and operatively associated with said receiving means for converting said first predetermined code to a second predetermined code of output information;

c) storage means supported on said registering apparatus, said storage means including an ordinal series of memory stop slides supported for individual movement to a plurality of value representative positions and wherein said memory stop slides are operatively associated with said decoding means for sensing said second predetermined code and operative for setting an associated memory stop slide in one of said value representative positions in response to a decoding operation;

d) means for supporting said storage means for movement relative to said decoding means whereby decoded input information can be serially entered into said ordinal series of memory stop slides; and e) readout means supported on said registering apparatus and operatively associated with said storage means for reading said information contained in said storage means in parallel.

2. A registering apparatus as defined in claim 1 further characterized in that said memory stop slides include means for moving individual ones of said memory stop slides to a value representative position and includes holding means for holding each of said memory stop slides in any one of said value representative positions.

3. A registering apparatus as described in claim 2 further characterized in that each of said memory stop slides includes indicator means to indicate the set position of said memory stop slide.

4. A registering apparatus as described in claim 3 further characterized in that each of said memory stop slides are individually spring biased to each of said value representative positions.

5. A registering apparatus as described in claim 4 further characterized in that each of said memory stop slides includes a plurality of ratchet teeth, one for each of said value representative positions and wherein said holding means includes individual spring biased latching means for each of said memory stop slides and operable for engagement with said memory stop slides for holding said memory stop slides in a value representative position in response to a decoding operation.

6. A registering apparatus as described in claim 4 further characterized in that said decoding means includes a plurality of stop elements positioned in the path of movement of said memory stop slide and wherein said stop elements include individual control means for moving said stop elements between a first position located in a path of movement of an aligned value sensing memory stop slide and a second position located out of the path of movement said sensing stop slide and wherein said stop elements are operable independently or in combination and operatively associated with an aligned memory stop slide located in a value receiving position for stopping said aligned memory stop slide in one of said value representative positions.

7. A registering apparatus as defined in claim 6 in which said receiving means includes a series of electromagnetic actuators for moving selected ones of said stop elements out of the path of movement of said stop slides in accordance with input information represented in said first predetermined code form.

8. A registering apparatus as defined in claim 7 in which said first predetermined code form is a binary code and wherein said stop elements are detailed in width so that selected combinations of said stop elements will allow sufficient rearward movement of said stop slide representative of decimal values 0 to 9 inclusive.

9. A registering apparatus as defined in claim 1 wherein said readout means includes an ordinal series of registering elements, and an ordinal series of actuator means positioned in said registering apparatus for transferring said second predetermined code in parallel from each of said value storage elements to each of said registering elements.

10. A registering apparatus as defined in claim 9 in which said actuators include an ordinal series of racks, and wherein said registering elements include an ordinal series of flexible print strips having decimal value 0 to 9 inclusive thereon.

11. In a registering apparatus as defined in claim 9 in which said registering elements include an ordinal series of flexible print strips having decimal values 0 to 9 inclusive thereon and wherein a print hammer is associated with each print strip and means are provided to cause each print hammer to strike the print strip against a platen to cause a print to be effected thereon.

* * * * *